Figure 1:
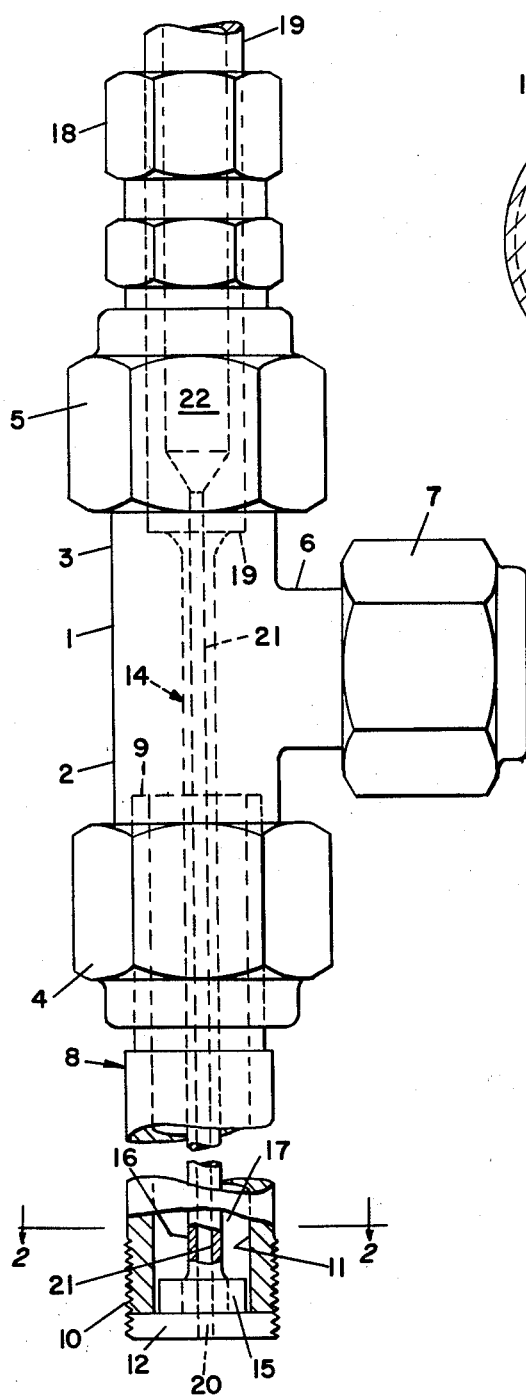

Oct. 13, 1964  W. B. HANSEL  3,152,616
ADJUSTABLE BACK PRESSURE VALVE
Filed April 26, 1963

INVENTOR.
WILLIAM B. HANSEL
BY George L. Church
ATTORNEY

United States Patent Office 3,152,616
Patented Oct. 13, 1964

3,152,616
ADJUSTABLE BACK PRESSURE VALVE
William E. Hansel, Media, Pa., assignor to Sun Oil Company, Philadelphia, Pa., a corporation of New Jersey
Filed Apr. 26, 1963, Ser. No. 275,934
15 Claims. (Cl. 138—40)

This invention relates to a valve, and more particularly to an adjustable back pressure valve.

By way of example, there will first be described a typical application of the valve of this invention. It has been found that certain endothermic chemical reactions may be carried out by subjecting the reactant material to one or more mechanical shock waves, thereby to produce a high temperature in such reactant material for a very short period of time. It is possible to convert natural gas (methane) into acetylene, or mixtures of natural gas and nitrogen into hydrogen cyanide and acetylene, by heating the reagents quickly to temperatures above 3500° F., the heating to be almost immediately followed by cooling to a temperature not substantially greater than 1600° F., the cooling rate being comparable to the heating rate. The required heating and cooling may be conveniently effected in a shock tube. A shock tube is a pipe in which a gas or a gas mixture (termed the process gas) can be heated very rapidly to very high temperatures by another gas, the driving gas, adiabatic compression being the heating mechanism. The sudden introduction into the shock tube of a high-pressure driving gas creates a shock wave which adiabatically compresses the gas in the shock tube, rapidly heating the process gas in such tube.

After the adiabatic compression process is complete, the driving gas (which may be hydrogen) is removed from the shock tube (wave engine) in three steps or stages. In the first stage, a portion of the driving gas is removed from the wave engine at a pressure of about twenty-two atmospheres. In the second stage, a second portion of the driving gas is withdrawn from the wave engine at a pressure of about seven atmospheres. In the third stage, the remainder of the driving gas is withdrawn from the wave engine at a pressure of about two atmospheres.

In order to remove the driving gas at the proper, desired, aforementioned pressures, some sort of back pressure regulating devices (one for each stage) are required, to establish and maintain the proper back pressures. The adjustable back pressure valve of this invention is eminently suitable for use as a back pressure regulating device in the environment described, and for three removal or withdrawal stages, three valves would be required, one for each stage. If the wave engine is double-ended (as it might well be, in a practical device), whereby withdrawal takes place at both ends of the shock tube, a total of six back pressure valves would be required.

An object of this invention is to provide a novel valve construction.

Another object is to provide a relatively simple back pressure valve.

The objects of this invention are accomplished, briefly, in the following manner: An elongated valve stem of generally cylindrical configuration but whose sides are cut away at one end to leave a substantially rectangular or I-shaped head, is positioned in the bore of an elongated valve body which is also of cylindrical configuration but whose sides are also cut away at one end to leave a substantially rectangular bar or I-shaped portion. The cutting away of one end of the valve body leaves a pair of D-shaped openings which provide communication between the exterior of the body and the bore in the body. The I-shaped head of the stem engages the inner side of the I-shaped portion of the body, so that by rotating the stem with respect to the body, the effective size of these D-shaped openings may be varied. The end of the body adjacent the aforesaid I-shaped portion is provided with threads, for screwing the valve into a threaded aperture in the device (for example, a wave engine) with which the valve is to be used, while the opposite end of the body is mounted in one arm of a standard T fitting, for example one of the "Swagelok" type. The stem passes through the T fitting, and the end of the stem remote from the head thereof is mounted in the aligned arm of the T fitting, so that this stem, after being rotatably adjusted to the proper position relative to the body, may be locked in its adjusted position. Between its I-shaped head and its said remote end, the valve stem is of reduced diameter, to provide an annular space within the bore of the body for passage of gas. The gas can pass through this annular space and thence out the third or non-aligned (orthogonal) arm of the T. The I-shaped portion of the valve body has a small central (axial) hole therethrough, and the valve stem has an axial bore extending entirely therethrough, from one end to the other of the stem, this latter bore being axially aligned with the hole in the valve body. The aforesaid hole and bore provide a means for coupling a pressure-measuring device (such as a pressure gauge) to the wave engine (or other high-pressure gas source) with which the valve is being used.

Figure 2:
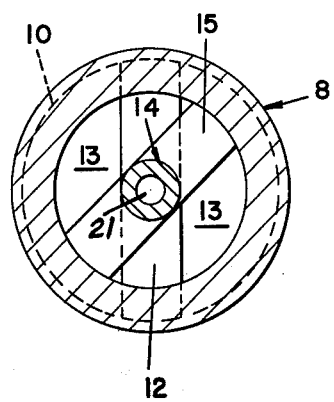

A detailed description of the invention follows, taken in conjunction with the accompany drawing, wherein:

FIG. 1 is a front elevation of the complete valve assembly on an enlarged scale, with a portion thereof broken away to show details in the internal construction; and FIG. 2 is a cross-section taken along line 2—2 of FIG. 1.

Refer now to the drawing. The operating parts of the valve assembly of the invention are mounted in a T fitting 1 of standard, conventional type, e.g., a "Swagelok" ½-inch T. This fitting has two aligned arms 2 and 3 defined by the coupling nuts 4 and 5, respectively, and an orthogonal arm 6 defined by a coupling nut 7. In fittings of the type referred to, the coupling nuts 4, 5, and 7 may be operated to sealingly secure to the T tubes or tubular members which pass through such nuts.

An elongated valve body, denoted generally by numeral 8, has at one end a smooth cylindrical portion 9 (of ½-inch nominal O.D.) and at its opposite end a set of male pipe threads 10. The smooth cylindrical portion 9 of the valve body 8 passes through the coupling nut 4 of the T fitting and is sealed into fitting 1 by means of this nut. By means of the threads 10, the valve assembly may be screwed into a threaded aperture or port provided in the device (e.g., a wave engine) with which the valve is to be used. A longitudinal cylindrical bore 11 (e.g., ⅜-inch in diameter) is drilled into valve body 8 from the end 9 thereof, this bore bottoming short of the extreme end of the body at the opposite or threaded end. Two opposite D-shaped portions of the body wall at the bottom of bore 11 are cut away or removed to leave a substantially rectangular bar or I-shaped portion 12 (see FIG. 2), which extends diametrically with respect to the substantialy cylindrical valve body 8. Since it is an element of a cylinder, the bar 12 will of course have arcuate ends. The cutting away of the body wall at this end of the body in the manner just described leaves two D-shaped openings 13 (see FIG. 2), which provide communication betwen the exterior of body 8 and the bore 11. Thus, when the valve body 8 is screwed into a threaded aperture or port in a device, one end of bore 11 can communicate with this port by way of openings 13; the other end of bore 11 opens directly into fitting 1.

An elongated valve stem 14, of generally cylindrical configuration, is positioned in the bore 11 of valve body 8. At one end, the sides of the cylinder (of stem 14) are cut away to leave a substantially rectangular or I-shaped head 15, which extends diametrically with respect to the cylinder of stem 14. It may be said that, at this end of stem 14, two opposite D-shaped portions of the cylinder are removed. Since it is an element of a cylinder, the head 15 will of course have arcuate ends. The length of head 15 (corresponding essentially to the diameter of the cylinder from which it is formed) is such that the ends of said head fit rather snugly against the wall of bore 11, with the outer end face of head 15 in engagement with the inner face of the I-shaped body portion 12, as illustrated in FIG. 1. The transverse dimensions (i.e., the widths) of I-shaped body portion 12 and of head 15 are equal to each other. It may be seen that, as stem 14 is rotated with respect to body 8, the head 15 on the stem covers and uncovers the openings 13; that is to say, it varies the effective size of these latter openings. The openings 13 will have their minimum effective size when the center lines of head 15 and of bar 12 lie at right angles to each other; these center lines are shown at 45° to each other in FIG. 2. Of course, the maximum effective size of openings 13 occurs when the center lines of items 12 and 15 are collinear. Thus, the effective cross-section or area of the fluid flow passage (which extends from the exterior of body 8 into the bore 11, by way of openings 13) is varied by rotary adjustment of stem 14 with respect to body 8. The purpose of the valve of this invention is to let a high-pressure gas (present in the threaded aperture of the wave engine, into which valve body 8 is screwed) expand at some calculated rate which is determinable by the effective cross-section of the fluid flow passage through the valve; by rotary adjustment of stem 14 with respect to body 8, this rate may be varied. To state this another way, by rotary adjustment of stem 14 with respect to body 8, the back pressure (for the high-pressure gas) may be regulated.

By way of example, the I-shaped head 15 may be ⅛-inch thick, measured axially of stem 14. Immediately inwardly of this head (or immediately above the same in FIG. 1), the stem 14 has a cylindrical portion 16 of reduced diameter (e.g., of ⅛-inch diameter) which extends through the open upper end of the bore 11 (at the upper end of body portion 9) to a point somewhat beyond or above the orthogonal arm 6 of fitting 1. This stem portion 16 of reduced diameter provides an annular passage 17 between such stem portion and the wall of bore 11. A gas outlet pipe or conduit (not shown) is coupled to the orthogonal arm 6 of the T fitting 1, by means of coupling nut 7. The fluid flow (gas flow) passage through the valve of this invention may then be traced as follows: from the exterior of body 8 (i.e., from the aperture or port into which valve body 8 is threaded), through openings 13 (whose effective area is controlled by the rotational adjustment of stem 14, as previously described), and thence through annular passage 17 in bore 11 and through T arm 6 to the gas outlet pipe.

In order to support stem 14 in position in bore 11, as well as to fix or secure it in a rotationally-adjusted position (with respect to body 8), and also to provide a seal (so that gas cannot escape anywhere except through the fluid flow passage previously mentioned), the stem is mounted in the aligned arm 3 of T fitting 1. In order to do this, a reducer fitting 18 is sealed into fitting 1 by means of coupling nut 5, which latter is associated with aligned arm 3 of the T fitting 1. Fitting 18 may be, for example, a "Swagelok" ⅜-inch T x ½-inch TX reducer. Beyond or above the reduced-diameter portion 16, the stem 14 has a cylindrical portion 19 of larger diameter (e.g., of ⅜-inch diameter) which extends loosely through the coupling nut 5 and passes through the reducer fitting 18. It is sealed into the fitting 1 by means of the coupling nut of reducer 18, and extends outwardly from this reducer a suitable distance. When the coupling nut of reducer 18 is loosened sufficiently, the free end of stem 14 may be grasped and manually rotated to the desired adjusted position (with respect to body 8, considering the relation of stem head 15 to body openings 13), after which the reducer coupling nut is tightened to lock stem 14 in the desired (rotationally-adjusted) position.

The rectangular bar 12 of the body has therein a centrally-located hole 20 of small diameter (e.g., of 55 mils diameter) which forms the initial portion of a pressure gauging conduit. An axial bore 21 of the same diameter, extending through portions 15 and 16 of stem 14, is aligned with hole 20 and forms a continuation of the pressure gauging conduit. Bore 21 extends into stem portion 19 a short distance, and it opens into a concentric bore 22 of larger diameter (e.g., of ¼-inch diameter), which latter extends to the free or upper end of stem 14. Items 20, 21, and 22 together provide a pressure gauging conduit, for gauging the pressure of the high-pressure gas in the port into which valve body 8 is threaded. A suitable pressure gauge (not shown) would be coupled to the outer end of bore 22, at the upper or free end (not shown) of stem 14.

It may be noted that the back pressure regulation is effected at the openings 13, which are at the extreme end of the valve. To state this another way, back pressure is provided at the extreme outer end of the valve. This is an important feature of the valve of this invention. For exhausting driving gas from a wave engine utilizing a shock tube, the back pressure should be provided as close to the shock tube as possible; that is to say, there should be a minimum volume between the shock tube and the valving surfaces. It may be seen that, using the valve of the present invention, when the valve assembly is screwed into a threaded aperture in the wave engine housing by means of threads 10, the valving surfaces 12, 15 may be inserted into the housing to a depth very close to the exhaust pocket of the engine, and thus very close to the shock tube itself. Thus, the minimum-volume requirements set forth above are easily satisfied.

The invention claimed is:

1. In a back pressure valve, an elongated valve body having a longitudinal cylindrical bore therein and having at one end thereof an opening which provides communication between said bore and the exterior of the body; an elongated generally cylindrical valve stem mounted for rotational adjustment within said bore, said stem having a portion of reduced diameter thereby to provide an annular passage between such stem and the bore wall; and means carried by said stem, and responsive to rotation thereof within said bore, for varying the effective area of said opening.

2. A valve as defined in claim 1, including also means for locking said stem in an adjusted position in said bore.

3. A valve as set forth in claim 2, wherein said locking means comprises a T fitting in one arm of which said stem is mounted.

4. A valve as defined in claim 1, including also a T fitting in one of whose two aligned arms said body is mounted and in the other of whose two aligned arms said stem is mounted.

5. A valve as set forth in claim 1, wherein said opening and said annular passage comprise a fluid flow passage through said valve.

6. A valve as defined in claim 5, including also a T fitting one of whose two aligned arms said body is mounted and in the other of whose two aligned arms said stem is mounted, the other arm of the T forming a continuation of the fluid flow passage.

7. A valve as set forth in claim 5, wherein said opening is substantially D-shaped, and wherein said means comprises a substantially I-shaped head on said stem arranged to cover and uncover said opening when said stem is rotated; said valve including also a T finding in one of whose two aligned arms said body is mounted and in the other of whose two aligned arms said stem is mounted, the other arm of the T forming a continuation of the fluid flow passage.

8. A valve as set forth in claim 1, wherein said opening is substantially D-shaped, and wherein said means comprises a substantially I-shaped head on said stem arranged to cover and uncover said opening when said stem is rotated.

9. A valve set forth in claim 1, wherein said stem has an axial bore extending entirely therethrough, to serve as a pressure gauging conduit.

10. A valve assembly comprising a T fitting having two aligned arms and one orthogonal arm; an elongated valve body mounted at one end in one of said aligned arms and extending outwardly therefrom, said valve body having a longitudinal cylindrical bore therein and having at its outer end an opening which provides communication between said bore and the exterior of the body; an elongated generally cylindrical valve stem mounted in the other of said aligned arms and extending through said bore, said stem being capable of rotation with respect to said body and being lockable in an adjusted position by means of said other T arm; and means carried by said stem, and responsive to rotation thereof with respect to said body, for varying the effective area of said opening.

11. A valve assembly as set forth in claim 10, wherein said opening is substantially D-shaped, and wherein said means comprises a substantially I-shaped head on said stem arranged to cover and uncover said opening when said stem is rotated.

12. A valve assembly as set forth in claim 10, wherein said stem has a portion of reduced diameter thereby to provide an annular passage between such stem and the bore wall.

13. A valve assembly as defined in claim 12, wherein said opening and said annular passage comprise a fluid flow passage through said valve, and where said orthogonal arm forms a continuation of the fluid flow passage.

14. A valve assembly as set forth in claim 12, wherein said opening and said annular passage comprise a fluid flow passage through said valve, wherein said orthogonal arm forms a continuation of the fluid flow passage, wherein said opening is substantially D-shaped, and wherein said means comprises a substantially I-shaped head on said stem arranged to cover and uncover said opening when said stem is rotated.

15. A valve assembly as set forth in claim 10, wherein said stem has an axial bore extending entirely therethrough, to serve as a pressure gauging conduit.

References Cited in the file of this patent

UNITED STATES PATENTS

| | | |
|---|---|---|
| 2,294,499 | Henkel et al. | Sept. 1, 1942 |
| 2,625,179 | Robertson et al. | Jan. 13, 1953 |
| 2,629,403 | Allen | Feb. 24, 1953 |